United States Patent
Hughes et al.

(10) Patent No.: US 9,391,969 B2
(45) Date of Patent: *Jul. 12, 2016

(54) DYNAMIC RADIUS

(71) Applicant: Verizon Patent and Licensing Inc., Arlington, VA (US)

(72) Inventors: Jeffrey W. Hughes, Green Mountain Falls, CO (US); Andrew L. Bates, Peyton, CO (US); Jared M. Allison, Amherst, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 116 days.

This patent is subject to a terminal disclaimer.

(21) Appl. No.: 14/148,276

(22) Filed: Jan. 6, 2014

(65) Prior Publication Data

US 2014/0130130 A1    May 8, 2014

Related U.S. Application Data

(63) Continuation of application No. 11/960,240, filed on Dec. 19, 2007, now Pat. No. 8,627,410.

(51) Int. Cl.
*G06F 7/04* (2006.01)
*H04L 29/06* (2006.01)

(52) U.S. Cl.
CPC ............ *H04L 63/08* (2013.01); *H04L 63/0892* (2013.01)

(58) Field of Classification Search
CPC ....................................................... G06F 21/30
USPC ............................................... 726/2–5, 26–30
See application file for complete search history.

(56) References Cited

U.S. PATENT DOCUMENTS

| | | | | |
|---|---|---|---|---|
| 6,715,082 | B1 * | 3/2004 | Chang ..................... | G06F 21/34 713/160 |
| 7,293,096 | B1 * | 11/2007 | Foltak ................. | H04L 63/0272 709/227 |
| 2003/0233572 | A1 * | 12/2003 | Van Ackere ........ | H04L 63/0892 726/15 |
| 2004/0073651 | A1 * | 4/2004 | Beaulieu ................. | H04L 29/06 709/223 |
| 2004/0187018 | A1 * | 9/2004 | Owen ..................... | G06F 21/31 713/184 |
| 2005/0256970 | A1 * | 11/2005 | Harrison ................. | H04L 63/08 709/238 |
| 2007/0005964 | A1 | 1/2007 | Grosse et al. | |
| 2007/0208718 | A1 * | 9/2007 | Javid ................. | G06F 17/30017 |
| 2007/0282959 | A1 * | 12/2007 | Stern ..................... | G06Q 30/02 709/206 |
| 2008/0040491 | A1 | 2/2008 | Minodier et al. | |
| 2008/0040773 | A1 * | 2/2008 | AlBadarin .............. | H04L 63/08 726/1 |
| 2010/0077447 | A1 * | 3/2010 | Dholakia ................ | H04L 63/08 726/3 |

OTHER PUBLICATIONS

Urien et al., "Introducing Smartcard Enabled RADIUS Server," Collaborative Technologies and Systems, 2006. CTS 2006. International Symposium on Year: 2006 pp. 74-80.*
Kui et al., "A redirection extension of RADIUS for 3GPP—WLAN interworking," Vehicular Technology Conference, 2004. VTC2004—Fall. 2004 IEEE 60th Year: 2004, vol. 5 pp. 3224-3228.*

* cited by examiner

*Primary Examiner* — Roderick Tolentino

(57) ABSTRACT

A system includes a remote authentication dial in user service (RADIUS) server in communication with a network access server. The network access server provides an authentication request to the RADIUS server. The authentication request includes at least a user identifier and a device identifier. The RADIUS server determines an authentication format utilized by the network access server based on the received authentication request. The system may also determine an authorization level to provide with an authentication response.

19 Claims, 4 Drawing Sheets

DYNAMIC RADIUS

CROSS REFERENCE TO RELATED APPLICATIONS

This application is a continuation application of U.S. patent application Ser. No. 11/960,240, filed on Dec. 19, 2007, the content of which is hereby incorporated by reference in its entirety.

BACKGROUND

Network Access Servers and network devices, such as internet servers, network printers, file servers, and Virtual Private Network Servers, often require an approved authorization request before they may be accessed by a user. In its simplest form, an authorization request consists of a username and password. One common method of processing an authorization request to a network device is via a Remote Authentication Dial-In User Service (RADIUS) server. Generally, a user wishing to access a network device or Network Access Server (NAS) connects through a client software program residing on a user-based computing device, such as a personal computer, a personal digital assistant (PDA), etc. A NAS is a device that can act as an access point for a user device. Many types of NAS devices are known. For example, among other things a NAS may be a dial-in modem, an internet protocol (IP) router, a secure shell (SSH) based remote access appliance, a network firewall appliance, a secure socket layer (SSL) remote access gateway appliance, or a virtual private network (VPN) server. Generally, to initiate a connection with a network device, the user device selectively transmits a series of data items to a NAS. The transmitted data items may include, for example, a user identifier and authentication code associated with the network device to be accessed. The authentication code may be, for example, a network password, a Lightweight Directory Access Protocol (LDAP) authentication mechanism, a hardware token identifier, etc.

In known RADIUS systems, each unique user identifier is tied to a single authentication mechanism. In addition, each unique user identifier can only store one set of data attributes, which may or may not be compatible across different classes of devices. Accordingly, for an end user to access a network device through more than one NAS and/or more than one authentication mechanism, the user must create separate user accounts having unique user identifiers for each class of NAS and/or authentication method. Thus, for a user to be able to access a network device, e.g., from home over a home IP router, and also to be able to access the network device, e.g., from a work site over a VPN server, the user generally must create separate user accounts using separate, unique user identifiers for each of these connections.

DETAILED DESCRIPTION OF PREFERRED EMBODIMENTS

Figure 1:
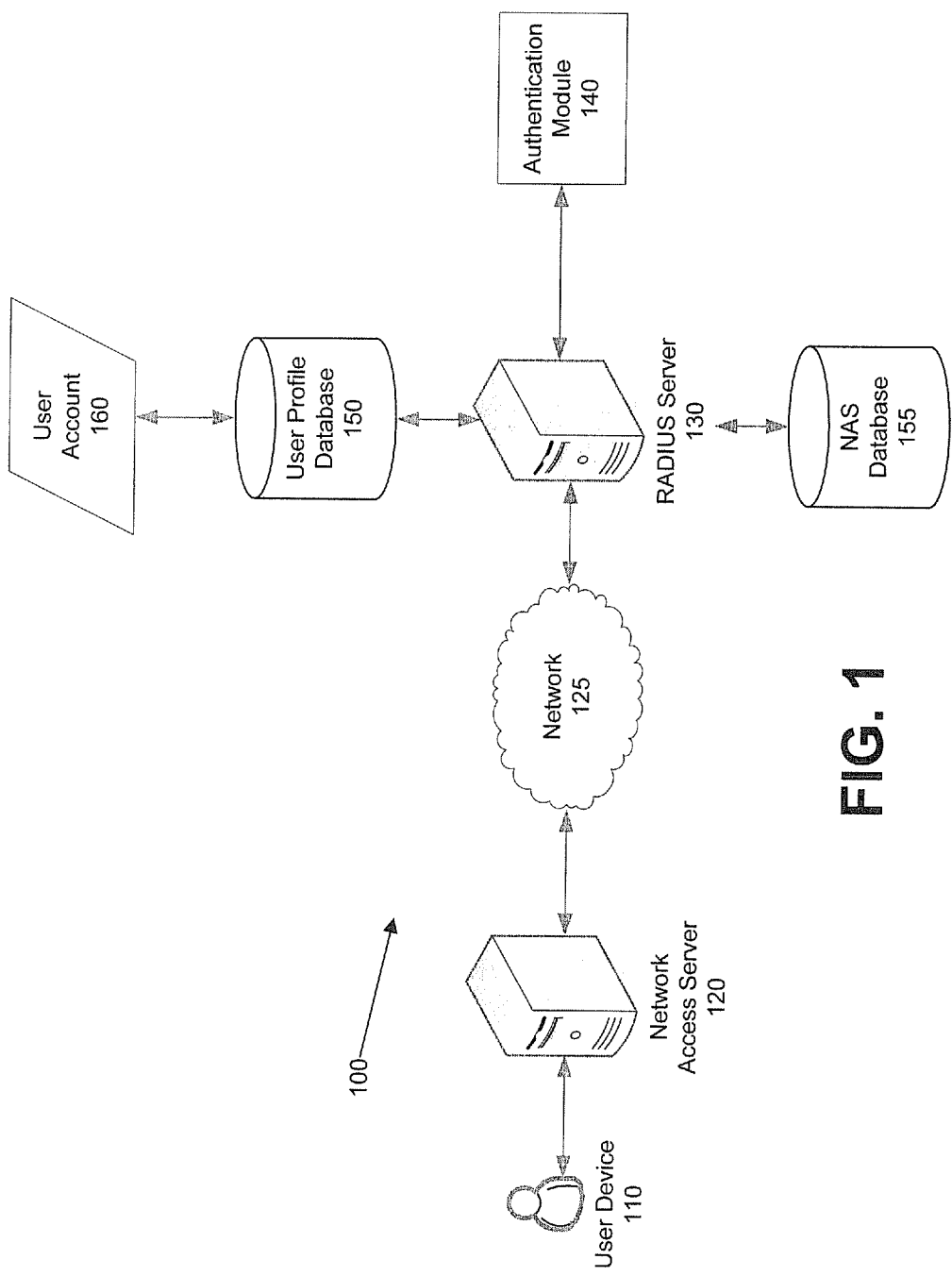
FIG. 1 illustrates an exemplary RADIUS server system.

In conventional RADIUS systems, the NAS connects to a RADIUS server. Based on a configured list, the RADIUS server determines if the NAS is approved to use the RADIUS server for authentication. If it is, the NAS provides the user identifier and the authentication code received from the user device to the RADIUS server. The RADIUS server communicates the user identifier and the authentication code to an authentication module. The authentication module analyzes the received user identifier and authentication code to determine the legitimacy of the authentication request. If the authentication module determines that the provided authentication code is an approved authentication code defined for the particular user identifier, the authentication module notifies the RADIUS server that the authorization request is accepted. Upon a successful authorization request, the RADIUS server may be configured to return connection attribute data, such as a connection attribute indicator, to the NAS. This connection attribute indicator may be used by the NAS to assign different levels of access, configure the session settings, such as controlling the length of time that a session may be maintained, or assignment of other environmental variables specific to that connection/authorization request. A limitation of conventional RADIUS servers is that a single user account can only store one unique set of data attributes. The problem that this brings up is that the data may be appropriate to return when a user is authenticating from a first class of device, such as a dial-in server, but not appropriate when authenticating from a different class of device, such as a network router.

The authentication response communicated by the RADIUS server must be provided to the NAS in a format specific to the type of NAS through which the authentication request is initiated, and must include attributes specific to the type of NAS. That is, a first NAS device, such as a VPN server, may require that an authentication response be provided in a first format and include a first set of attributes, such as through a LDAP authentication mechanism, while a second NAS device, such as an IP router, may require that an authentication response be provided in a second format and include a second set of attributes, such as through an encrypted password authentication mechanism. Thus, each NAS may require an authentication response provided using a specific authentication mechanism, which may require specific sets of parameters to be returned in predefined formats for authentication.

Further, with conventional RADIUS systems comprising multiple NAS devices, similar NAS devices on a common RADIUS system generally must authenticate using a common authentication mechanism. User accounts accessed through those similar NAS devices generally are provided with a common level of authentication or access.

Moreover, in typical RADIUS systems, a RADIUS server generally is configured to communicate with NAS devices using a single authentication mechanism. Thus, in order to implement a system including multiple NAS devices, using multiple authentication mechanisms, each authentication mechanism requires a dedicated RADIUS server configured to communicate in the format required by the respective NAS devices.

FIG. 1 illustrates an exemplary RADIUS system 100 which may be useful for authentication of a user-based computing device 110 accessing a network device. System 100 includes a user-based computing device 110 configured to selectively communicate with a network access server (NAS) 120. User-based computing device 110 may include, by way of example and not of limitation, a mobile or non-mobile personal computer, a workstation, a cellular telephone, an automated teller machine (ATM), a television set top box (STB), etc. NAS 120 may be, for example, a Secure Socket Layer (SSL) Remote Access Gateway Appliance, a virtual private network (VPN) server, a network firewall appliance, a Secure Shell (SSH) Remote Access Gateway, an Internet Protocol (IP) router, a dial-in modem, etc. User-based computing device 110 may selectively communicate with NAS 120, for instance, over a network. The network may be a local area network (LAN), generally a packet switch network, a wide area network (WAN), or other network as may be known. Alternatively, user-based computing device 110 may communicate with NAS 120 directly over a wired connection or a wireless connection.

NAS 120 may be configured to selectively communicate with a RADIUS server 130. NAS 120 may communicate with RADIUS server 130 over a network 125. Network 125 may be a local area network (LAN), generally a packet switch network, a wide area network (WAN), or other network as may be known. Such network 125 may, but need not, include the Internet. NAS 120 may be configured to selectively transmit data to RADIUS server 130 to authenticate a user or user-based computing device 110 attempting to access a network or network device, such as an internet server, a file server, a database, a software application, a printer, etc.

Figure 3:
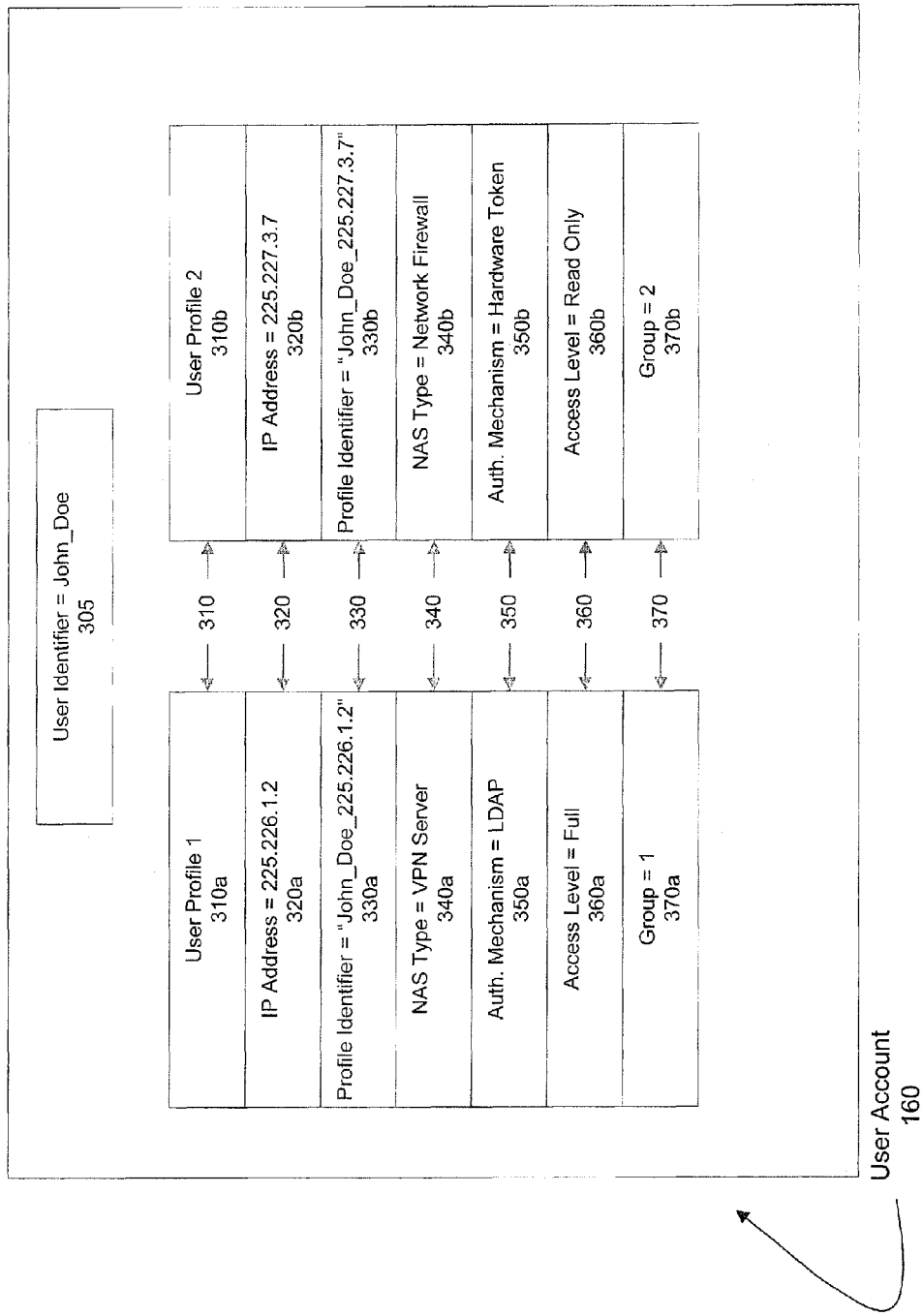
FIG. 3 illustrates an exemplary user account.

Referring now to FIG. 3, an exemplary user account 160 is illustrated having a user identifier 305 and including a first user profile 310a and a second user profile 310b. A user profile 310, such as first user profile 310a or second user profile 310b, may include a device identifier 320, which may uniquely identify a NAS 120. By way of example, and not of limitation, device identifier 320 may include an IP address corresponding to a specific NAS 120, as illustrated in 320a and 320b. Each user profile 310 may also include a profile identifier 330, which may be a combination of the user identifier 305, and device identifier 320. User profile 310 may further include a NAS type indicator 340, indicating the type of NAS 120 associated with the profile 310, an authentication mechanism indicator 350, indicating the method of authentication required for the NAS 120, a connection attribute indicator 360, indicative of the nature of the access to be granted to the user upon successful authentication, and a group indicator 370 indicative of a group to which the user profile may belong.

As illustrated, the first user profile 310a includes a first device identifier 320a corresponding to a first NAS 120. Profile identifier 330a is identified by the combination of user identifier 305 and first device identifier 320a. First user profile 310a further includes NAS Type indicator 340a indicating the type of network access server 120 associated with the first user profile 310a, an authentication mechanism indicator 350a indicating the authentication mechanism used by NAS 120, a connection attribute indicator 360a indicating the nature of the access to be granted to the user-based computing device 110 upon successful authentication, and a group indicator 370a which may indicate a group to which the user profile may belong.

Similarly, the second user profile 310b includes a second device identifier 320b corresponding to a second NAS 120. Profile identifier 330b is identified by the combination of user identifier 305 and second device identifier 320b. Second user profile 310b further includes NAS Type indicator 340b indicating the type of network access server 120 associated with the second user profile 310b, an authentication mechanism indicator 350b indicating the authentication mechanism used by NAS 120, a connection attribute indicator 360b indicating the nature of the access to be granted to the user-based computing device 110 upon successful authentication, and a group indicator 370b which may indicate a group to which the user profile may belong.

While user account 160 is shown as including two user profiles 310a, 310b, it is to be understood that this is by way of example and not of limitation, and that user account 160 may include any number of user profiles as is required. In one exemplary approach, an administrator may selectively access user profile database 150 to input additional user accounts 160, or additional user profiles 310 within existing user accounts 160.

Considering FIG. 1 in combination with FIG. 3, RADIUS server 130 may be configured to selectively receive one or more data parameters from the NAS 120. For example, RADIUS server 130 may be configured to receive a NAS identifier, such as an IP address of the NAS 120. RADIUS server 130 may be in selective communication with a NAS database 155. Upon receipt of the NAS identifier, RADIUS server 130 may communicate with NAS database 155 to determine whether NAS 120 is permitted to use RADIUS server 130 for authentication purposes. RADIUS server 130 may also receive an authentication request from NAS 120. The authentication request may include at least a user identifier 305 representing the user of user-based computing device 110, a device identifier 320 corresponding to NAS 120, which may be the IP address of the NAS 120, as well as at least one authentication parameter. The authentication parameter may include, e.g., a user supplied password, which may be encrypted, a token ring identifier, a SecurID identifier, a LDAP authentication identifier, etc., associated with a specific user and/or user-based computing device 110.

RADIUS server 130 may be in selective communication with a user profile database 150, e.g., through a network. In some situations, however, a user profile database 150 may be directly associated with RADIUS server 130. User profile database 150 may include one or more user accounts 160. The one or more user accounts 160 may include one or more user profiles 310. The user profiles 310 within a given user account 160 may be uniquely defined using a profile identifier 330, which may be defined as a combination of a common user identifier 305 and a device identifier 320 of a NAS device 120. User account 160 may thus include information such as a user identifier 305 associated with a user, and one or more device identifiers 320 corresponding to one or more NAS devices 120 associated with the user identifier 305 and through which the user may access the RADIUS server 130. User profiles 310 may include one or more connection attribute indicators 360, which may be used by NAS 120 to define the nature of access given to a user accessing a network device over a respective one or more NAS 120, as well as an indicator of one or more authentication mechanisms 350 used by respective one or more NAS devices 120. Such authentication mechanisms may include a password, LDAP, SecurID, and the like as noted above. A given authentication mechanism may require that certain specific data parameters be provided to NAS 120, and that the specific parameters be provided in a specific format. The specific data parameters and the specific formats may, but need not, differ for each NAS 120 and/or each authentication mechanism.

User profiles 310 may also include one or more group indicators 370. Group indicators 370 may indicate a group to which a particular user, user device 110 or NAS 120 may belong. Group identifiers may include, e.g., attribute data common to members of the group. For instance, a number of unique user profiles 310 may be included in a single group, and all members of the group may have one or more common attributes. For example, members may share a common authentication method, a common connection attribute indicator 360 indicative of connection attributes which are to be used for connections groups members, etc. Group indicators 370 may be used in conjunction with, or in lieu of, other indicators, such as authentication mechanism indicator 350, connection attribute indicator 360, etc. In this manner attributes, such as connection attribute indicator 360, corresponding to a series of users or user devices can be controlled or edited by selectively editing group attribute information. Group attribute may be stored in a group database (not picture) which may be selectively accessible by RADIUS server 130. Group information may also be stored on a database, such as NAS database 155, or user profile database 150, directly on RADIUS server 130, etc.

User profile database 150 may include a series of user accounts 160. User accounts 160 may each include one or more user profiles 310 associated with a given user identifier 305. For instance, a single user account 160 may include a user identifier 305, which user identifier 305 may be tied to both a first user profile 310a and a second user profile 310b. The first user profile 310a may be defined by the combination of the user identifier 305 and a device identifier 320a of a first NAS device 120. The second user profile 310b may be defined by the combination of the user identifier 305 and a device identifier 320b of a second NAS device 120. The first user profile 310a may include authentication information useful for authentication and access through the first NAS device 120. For example, the first user profile 310a may indicate the authentication mechanism to be used when access is requested through the first NAS device 120, as well as the connection attribute 360 to be provided to the first NAS device 120 when the network device is so accessed. The second user profile 310b may include authentication information related to authentication and access through the second NAS device 120. For example, the second user profile 310b may indicate the authentication mechanism to be used when authentication is requested through the second NAS device 120, as well as the connection attribute 360 to be provided to the second NAS device 120 when the network device is so accessed.

The NAS device 120 associated with the first user profile 310a and the NAS device 120 associated with the second user profile 310b may, but need not, be the same type of NAS device 120 and may, but need not, use a common authentication mechanism. Similarly, the connection attribute 360 provided when authentication is requested by a user through a first NAS device 120 may differ from the connection attribute 360 when authentication is requested through a second NAS device 120.

Upon receiving an authentication request from NAS 120, the RADIUS server 130 may access a corresponding user account 160 located in user profile database 150. RADIUS server 130 may then access a specific user profile 310 stored within user account 160 using a profile identifier 330, which is the combination of a user identifier 305 and device identifier 320 provided by NAS device 120. RADIUS server 130 may thus determine from the user account 160 the type of NAS 120 associated with the provided device identifier 320, as well as the authentication mechanism to be utilized for the requested authentication, including parameters required and the format in which the parameters must be provided.

The RADIUS server 130 may also be in selective communication with one or more authentication modules 140. Authentication modules 140 may be software or hardware modules configured to perform authentication tasks related to one or more authentication mechanisms. Authentication modules 140 may reside on RADIUS server 130. Alternatively, authentication modules 140 may be located on a database or server accessible to RADIUS server 130, including but not limited to user profile database 150, or NAS database 155.

Each of the one or more authentication modules 140 may be configured to process authentication requests received in a particular authentication format or through a particular authentication mechanism. For instance, a first authentication module 140 may be configured to process authentication requests received in LDAP format, whereas a second authentication module 140 may be configured to process authentication requests received in a Hardware Token (HT) format.

The RADIUS server 130 may selectively transmit information related to a user authentication request received from a NAS device 120 to an authentication module 140. RADIUS server 130 may determine an appropriate authentication module 140 through which a given authentication request may be processed based, at least in part, on information retrieved from the user profile 310.

Authentication module 140 may process a received user identifier 305 and authentication parameter to determine whether the user is to be given access to the requested network or network device. Authentication module 140 may subsequently transmit an authentication signal to RADIUS server 130 to indicate whether user-based computing device 110 is to be granted access. RADIUS server 130 may be configured such that additional authentication modules 140 may be subsequently added to system 100 to allow authentication requests to be processed in additional manners.

When it has been determined by authentication module 140 that user-based computing device 110 is to be given access to the requested network device, RADIUS server 130 develops an authentication response to be sent to NAS 120. RADIUS server 130 may format the authentication response based in part on the format and the parameters required for NAS 120, which may be determined at least in part through information stored in a user profile 310 of user account 160, and which may include the connection attribute indicator 360 that will govern a connection through NAS 120. NAS 120 may thereby determine a level of access which the user-based computing device 110 is to be given to the network or network device. For instance, a user-based computing device 110 may be granted full access to a network device. Alternatively, user-based computing device 110 may be granted access to a subset of functions available through a network device, or, despite being authenticated, may be granted no access to network device functions.

Accordingly, a single RADIUS server 130 may selectively communicate with multiple network access servers 120, even though the multiple network access servers 120 may each require authentication responses to be provided in unique formats. By selectively receiving a user identifier 305 and a device identifier 320 associated with each authentication request, RADIUS server 130 may determine required authentication mechanisms for each authentication request.

Further, RADIUS server 130 may selectively authenticate a user having a single user identifier 305 over each of a plurality of network access servers 120. Upon receiving a request from a NAS 120, RADIUS server 130 may compare a received NAS identifier against NAS database 155. When NAS 120 is approved, RADIUS server 130 may subsequently receive an authentication request. As an authentication request is received, RADIUS server 130 may communicate with user profile database 150 to access a user account 160. RADIUS server 130 may then determine from the account 160 the type of NAS 120, and the authentication mechanism required, based on the device identifier 320 received.

Figure 2:
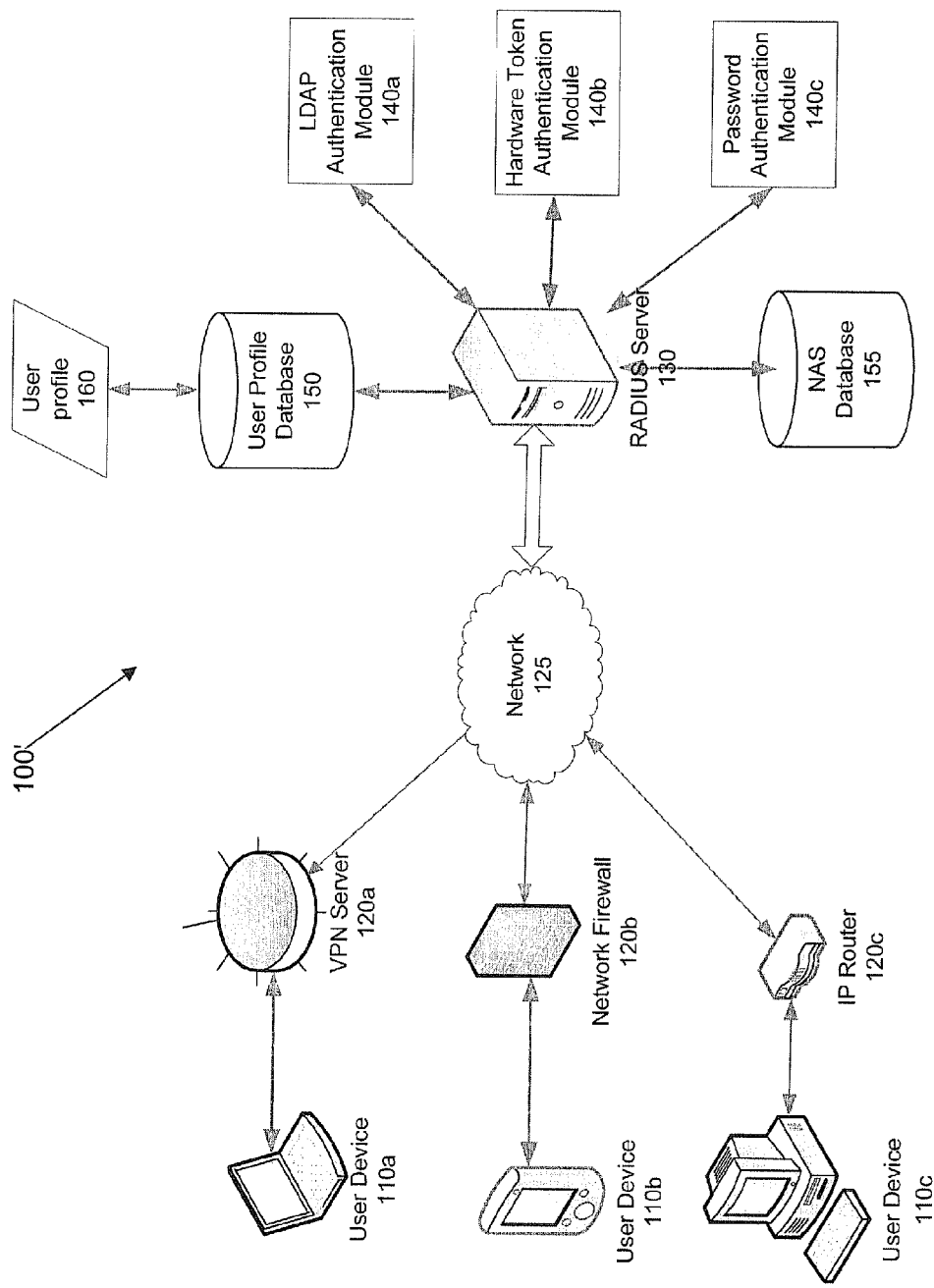
FIG. 2 illustrates an exemplary RADIUS server system.

FIG. 2 illustrates an exemplary RADIUS system 100' which may be useful for a single user authenticating a user-based computing device 110 such as a laptop computer 110*a*, a personal digital assistant (PDA) 110*b*, or a computer workstation 110*c*, to access a network or network device, such as an internet server, a network printer, etc, through a network access server 120 such as VPN server 120*a*, network firewall appliance 120*b*, or IP router 120*c*, respectively.

NAS 120*a*, 120*b*, 120*c* may receive an authentication request from a user-based computing device 110*a*, 110*b*, 110*c*. The authentication request may include a user identifier 305 and an authentication parameter. The NAS 120*a*, 120*b*, 120*c* may be in selective communication with RADIUS server 130. The NAS 120 may transmit a NAS identifier, such as an IP address to the RADIUS server 130, which may compare the NAS identifier to a NAS database 155 to determine whether the NAS 120 is permitted to access RADIUS server 120. Upon being granted access, NAS 120*a*, 120*b*, 120*c* may transmit the authentication request, as well as the device identifier 320 of the NAS 120*a*, 120*b*, 120*c* to RADIUS server 130.

RADIUS server 130 may be in selective communication with one or more user profile databases 150. Upon receiving an authentication request from NAS 120*a*, 120*b*, 120*c*, RADIUS server 130 may locate a user account 160 associated with the received user identifier 305. Upon retrieving the user account 160, RADIUS server 130 may locate a user profile 310 associated with the user identifier 305 and the device identifier 320 of the requesting NAS 120*a*, 120*b*, 120*c*. From the user profile 310 stored within user account 160, the RADIUS server 130 may determine the type of NAS 120*a*, 120*b*, 120*c*, as well as the authentication mechanism incorporated by the NAS 120*a*, 120*b*, 120*c*. RADIUS server 130 may further determine the connection attribute indicator 360 associated with the user-based computing device 110*a*, 110*b*, 110*c*, indicative of the nature of the connection to be provided should the authentication be successful.

Once RADIUS server 130 determines the authentication mechanism incorporated by NAS 120*a*, 120*b*, 120*c*, RADIUS server 130 may then transmit the authentication request to the appropriate authentication module 140 to process the authentication request, such as, in one illustrative example, LDAP authentication module 140*a*, hardware token authentication module 140*b*, or password authentication module 140*c*. Authentication module 140*a*, 140*b*, 140*c*, may process the authentication request to determine whether the requesting user-based computing device 110 should be granted access. Authentication module 140*a*, 140*b*, 140*c*, may then provide an authentication signal to RADIUS server 130, indicating whether user-based computing device 110*a*, 110*b*, 110*c* has successfully been authenticated.

The RADIUS server 130 may then transmit the response to the requesting NAS 120*a*, 120*b*, 120*c* in the format required by that particular NAS 120. That is, when it has been determined by authentication module 140*a*, 140*b*, 140*c* that the user-based computing device 110*a*, 110*b*, 110*c* is to be given access to the requested network or network device, the RADIUS server 130 develops an authentication response to be sent to NAS 120*a*, 120*b*, 120*c*. The authentication response may include the connection attribute indicator 360. The RADIUS server 130 formats the authentication response based on the required parameters and the required format for the particular NAS 120*a*, 120*b*, 120*c*.

Computing devices, such as those mentioned above, may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system. Computing devices may include any one of a number of computing devices that are known, including, without limitation, a computer workstation, a desktop, notebook, laptop, handheld computer, or some other computing device.

Computing devices generally include instructions executable by one or more computing devices such as those listed above. Computer-executable instructions may be compiled or interpreted from computer programs created using a variety of known programming languages and/or technologies, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

Figure 4:
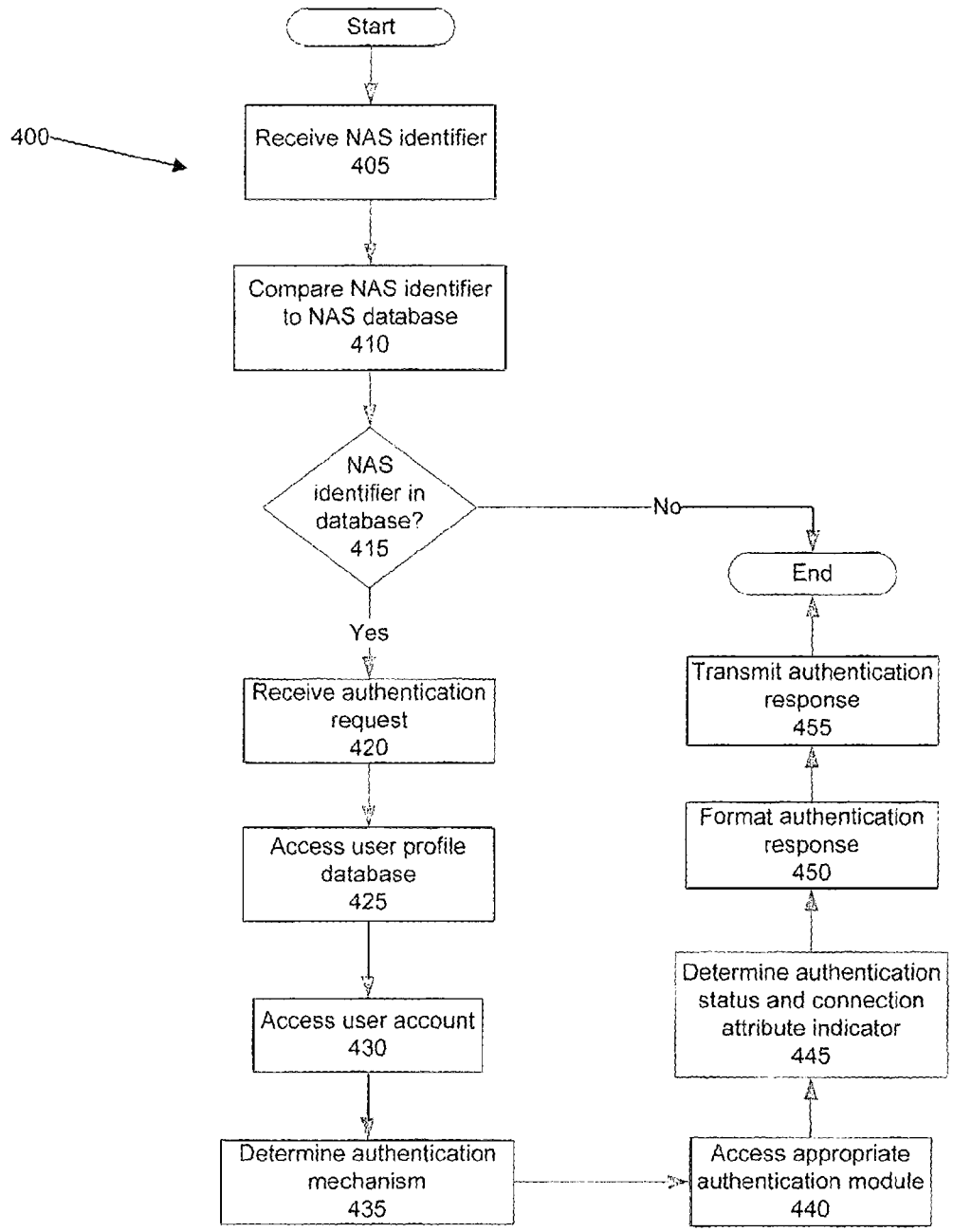
FIG. 4 illustrates an exemplary process for authentication.

FIG. 4 illustrates an exemplary process 400 for authentication of a user-based computing device 110 within system 100.

At step 405, the RADIUS server 130 receives data from NAS 120. The data includes a device identifier, such as the IP address of the NAS 120.

At step 410, the RADIUS server compares the device identifier to a list of acceptable device identifiers stored in a database, such as NAS database 155, to determine whether NAS 120 is approved to access RADIUS server 130. In addition, the data received from NAS 120 may include one or more authentication parameters to ensure validity or credibility of the received information.

At step 415, if the received NAS identifier is not included in the NAS database, the NAS 120 is denied access and the process ends. If the NAS identifier is included in the list of approved identifiers, the NAS 120 is allowed to continue with authentication request.

At step 420, an authentication request is received by RADIUS server 130 from NAS 120. The authentication request may include a user identifier, a device identifier associated with NAS 120, and an authentication parameter, such as a password, etc.

Next, at step 425, RADIUS server 130 accesses a user profile database 150. RADIUS server 130 may access user profile database 150 over a network, such as a LAN or a WAN.

Next, at step 430, RADIUS server 130 accesses the user account 160 associated with the received user identifier 305. RADIUS server 130 further accesses an appropriate user profile 310 stored within user account 160, the user profile 310 identified by the profile identifier 330, which may be the combination of user identifier 305 and device identifier 320 of NAS 120.

At step 435, when the appropriate user profile 310 has been located within user account 160, RADIUS server 130 determines the authentication mechanism associated with NAS 120 through authentication type indicator 350.

Next, at step 440, RADIUS server 130 determines an appropriate authentication module 140 configured to process the received authentication request using the authentication mechanism identified in step 435. RADIUS server 130 then transmits the authentication request to the identified authentication module 140.

At step 445, RADIUS server 130 determines authentication status based on an authentication signal received from authentication module 140. Further, RADIUS server 130 determines connection attribute indicator 360 stored within user profile.

Next, at step 450, RADIUS server 130 formats the authentication response to provide the parameters required by NAS 120, and to provide the parameters in the format required by NAS 120.

Finally, at step 455, RADIUS server 130 transmits the authentication response to NAS 120, which determines the nature of the device 110 access based on the connection attribute indicator 360.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising:
    a remote authentication dial in user service (RADIUS) server having a memory and a processor configured to execute computer executable instructions stored on the memory to:
        receive an authentication request from a network access server (NAS) of a plurality of NASs, the NAS having a processor, the authentication request including a device identifier of the NAS and a user identifier;
        access a user account from a plurality of user accounts based on the user identifier, the user account including at least a first user profile and a second user profile, each including a profile identifier that is a combination of the user identifier and a device identifier of one of the plurality of NASs;
        access one of the at least a first user profile and a second user profile for which the device identifier matches the received device identifier, from the user account to determine an NAS authorization format, wherein access of the user profile is based on the authentication request;
        identify an NAS authorization type indicator from the accessed user profile, wherein the NAS authorization type indicator includes the NAS authorization format;
        identify a manner in which the authorization request should be processed into a processed authorization request based on the NAS authorization type indicator; and
        provide an authorization response to the NAS, wherein the authorization response is formatted according to the NAS authorization format.

2. The system of claim 1, wherein the user profile includes an authentication mechanism having the NAS authorization format and authentication parameters, the RADIUS server further configured to:
    select a first authentication module capable of properly processing the authorization request, the first authentication module being selected from a plurality of authentication modules, and wherein selection of the first authentication module is based on the authentication mechanism;
    provide the authorization request to the first authentication module; and
    receive the processed authorization request from the first authorization module.

3. The system of claim 1, wherein the authentication request further includes a password, and wherein access of the user account is further based on the password.

4. The system of claim 1, wherein the RADIUS server is further configured to:
    receive a second authentication request from a second NAS of the plurality of NASs, the second authentication request including a second device identifier of the second NAS and the user identifier;
    access a second user profile from the user account to determine a second authentication mechanism, wherein access of the second user profile is based on the second authentication request; and
    select a second authentication module different from the first authentication module and capable of properly processing the second authorization request, wherein selection of the second authentication module is based on the second authentication mechanism.

5. The system of claim 1, wherein the RADIUS server is further configured to:
receive the device identifier prior to reception of the authorization request; and
match the device identifier with a corresponding device identifier from a plurality of device identifiers; and
request the authorization request from the NAS after the device identifier is matched with the corresponding device identifier.

6. The system of claim 1, wherein the device identifier is an internet protocol (IP) address of the NAS.

7. The system of claim 1, wherein the authorization response includes a connection attribute, the connection attribute determining a level of access to at least one of a network and a network device.

8. A method comprising
receiving, at a remote authentication dial in user service (RADIUS) server, an authorization request from a network access server (NAS), the authorization request including a user identification and an NAS identification;
access a user account from a plurality of user accounts based on the user identifier, the user account including at least a first user profile and a second user profile, each including a profile identifier that is a combination of the user identifier and a device identifier of one of the plurality of NASs;
identifying one of the at least a first user profile and a second user profile for which the device identifier matches the NAS identification received with the authorization request;
determining an authentication mechanism of the NAS from the user profile, wherein the authentication mechanism includes an authorization format;
identifying a proper processing module to process the authorization request from a plurality of processing modules, wherein identifying the proper processing module is based on the authentication mechanism;
creating an authorization response in a format corresponding to the authorization format, wherein creating the authorization response is based on a processed authorization request received from the proper processing module; and
providing the authorization response to the NAS, wherein the authorization response is formatted according to the NAS authorization format.

9. The method of claim 8 further comprising:
identifying a first user account from a plurality of user accounts based on at least the user identification, wherein the user profile is one of a plurality of user profiles from the user account; and
providing the authorization response to the NAS.

10. The method of claim 8, wherein the authorization response includes a connection attribute selected from the user profile, and wherein the connection attribute determines a level of access for a user associated with the NAS.

11. The method of claim 8, wherein the authorization request further includes a password.

12. The method of claim 8 further comprising:
receiving the NAS identification prior to receiving the authorization request, wherein the NAS identification includes an internet protocol (IP) address;
comparing the NAS identification to a plurality of NAS identifications in a database; and
approving acceptance of the authorization request if the NAS identification is found the database.

13. The method of claim 8 further comprising providing the first authorization request to the proper processing module to create the processed authorization request.

14. A remote authentication dial in user service (RADIUS) server comprising a memory and a processor configured to execute computer executable instructions stored on the memory to:
receive an authentication request from a network access server (NAS) associated with a user, wherein the authentication request includes a user identifier and an internet protocol (IP) address of the NAS;
access a user account from a plurality of user accounts based on the user identifier, the user account including a plurality of user profiles, each including a profile identifier that is a combination of the user identifier and a device identifier of one of a plurality of NASs;
access one of the plurality of user profiles for which the device identifier matches the IP address of the NAS received with the authentication request, wherein the user profile includes NAS authentication format information;
identify an NAS authorization type indicator from the accessed user profile, wherein the NAS authorization type indicator includes the NAS authorization format;
identify a manner in which the authorization request should be processed into a processed authorization request based on the NAS authorization type indicator;
determine that the NAS is to be given access to at least one of a network device and a network based on the authentication request;
format the authentication request according to the NAS authentication format information to create a formatted authentication response in proper format for the NAS; and
provide the formatted authentication response to the NAS.

15. The RADIUS server of claim 14 further configured to identify a user account from a plurality of user accounts based on the user identifier, wherein the user account includes a plurality of profiles associated with the user, and wherein each profile of the plurality of profiles associated with the user is associated with a different IP address.

16. The RADIUS server of claim 14 further configured to:
receive the IP address in a communication prior to the reception of the authentication request;
compare the IP address to a plurality of IP address; and
receive the authentication request based on the comparison of the IP address to the plurality of IP addresses.

17. The RADIUS server of claim 14 further configured to:
select a single authentication module from a plurality of authentication modules to process the authorization request, wherein selection of the authentication module is based on the NAS authentication format information;
provide the authentication request to the single authentication module; and
receive notification from the single authentication module that the NAS may be given access to at least one of the network device and the network, wherein reception of the notification occurs after the authentication request is provided to the single authentication module.

18. The RADIUS server of claim 17, wherein each authentication module of the plurality of authentication modules is configured for authentication processing in a different format.

19. The RADIUS server of claim 17, wherein the RADIUS server comprises the plurality authentication modules.

* * * * *